United States Patent [19]
Amberger et al.

[11] Patent Number: 4,546,050
[45] Date of Patent: Oct. 8, 1985

[54] COATED GLASS ARTICLE AS A NEW ARTICLE OF MANUFACTURE

[75] Inventors: Charles J. Amberger, Northville; James N. Lingscheit, Dearborn, both of Mich.

[73] Assignee: Ford Motor Company, Dearborn, Mich.

[21] Appl. No.: 674,383

[22] Filed: Nov. 23, 1984

[51] Int. Cl.$^4$ .............................................. C25D 11/34
[52] U.S. Cl. .................... 428/630; 428/623; 428/638; 428/660; 428/667; 428/677
[58] Field of Search ............... 428/623, 630, 638, 660, 428/667, 677

[56] References Cited

U.S. PATENT DOCUMENTS

| | | | |
|---|---|---|---|
| 3,010,850 | 11/1961 | Colbert et al. | 117/211 |
| 3,264,074 | 8/1966 | Jones | 29/183.5 |
| 3,854,892 | 12/1974 | Burgess et al. | 29/196.1 |
| 4,022,947 | 5/1977 | Grubb et al. | 428/469 |
| 4,235,048 | 11/1980 | Gillery | 49/390 |
| 4,272,588 | 6/1981 | Yoldas et al. | 428/433 |
| 4,382,977 | 5/1983 | Murphy et al. | 427/42 |
| 4,451,525 | 5/1984 | Kawazoe et al. | 428/213 |
| 4,504,553 | 3/1985 | Aubert | 428/630 |

Primary Examiner—Veronica O'Keefe
Attorney, Agent, or Firm—William E. Johnson; Clifford L. Sadler

[57] ABSTRACT

This specification is directed to a new article of manufacture. In particular, the article is a glass sheet having first and second sides spaced apart in generally parallel planes with a multilayer coating on one of the sides of the glass sheet. The side of the glass sheet having the multilayer coating thereon is designated as the film side of the glass sheet while the other side is designated as the glass side of the glass sheet. The multilayer coating film is a film selected from the group of films consisting of a copper, stainless steel, titanium dioxide multilayer film; a copper, titanium, titanium dioxide multilayer film; and a copper, titanium, titanium nitride multilayer film. The multilayer coating film is characterized, when applied to 6 mm thick clear glass, as having: (1) a film side Y-x-y chromaticity value of reflective color falling within area A of the graph of FIG. 1 of this specification; (2) a glass side Y-x-y chromaticity value of reflective color falling within area B of the graph of FIG. 2 of this specification; (3) a visible transmittance of 5-40% for an Illuminant "C" light source; and (4) a capital Y reflectance value from 5-55 for film side reflectance and 10-45 for glass side reflectance. The color generated by this glass is one which gives a very soft copper color of great beauty and very desirable for glazing used for large building structures.

3 Claims, 2 Drawing Figures

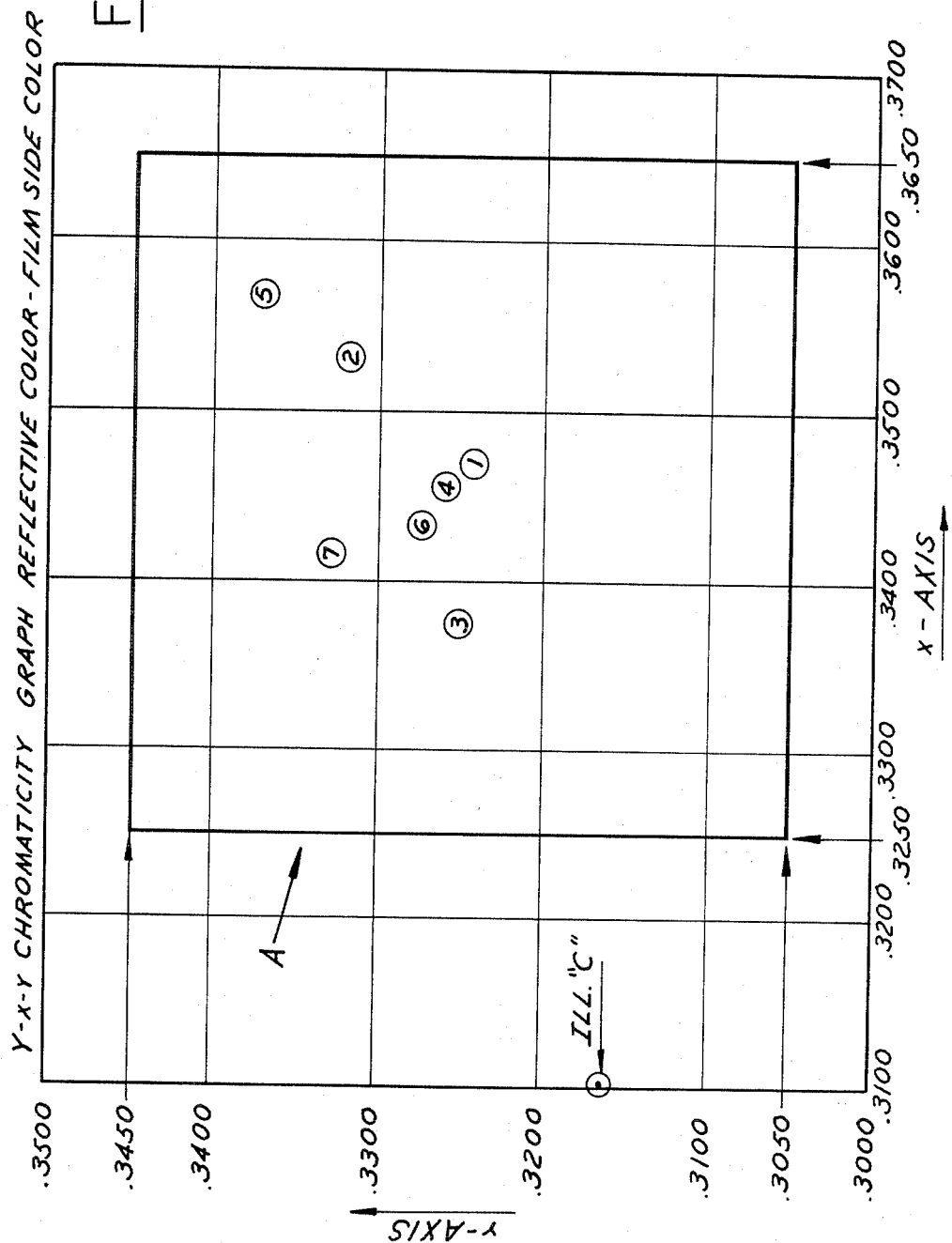

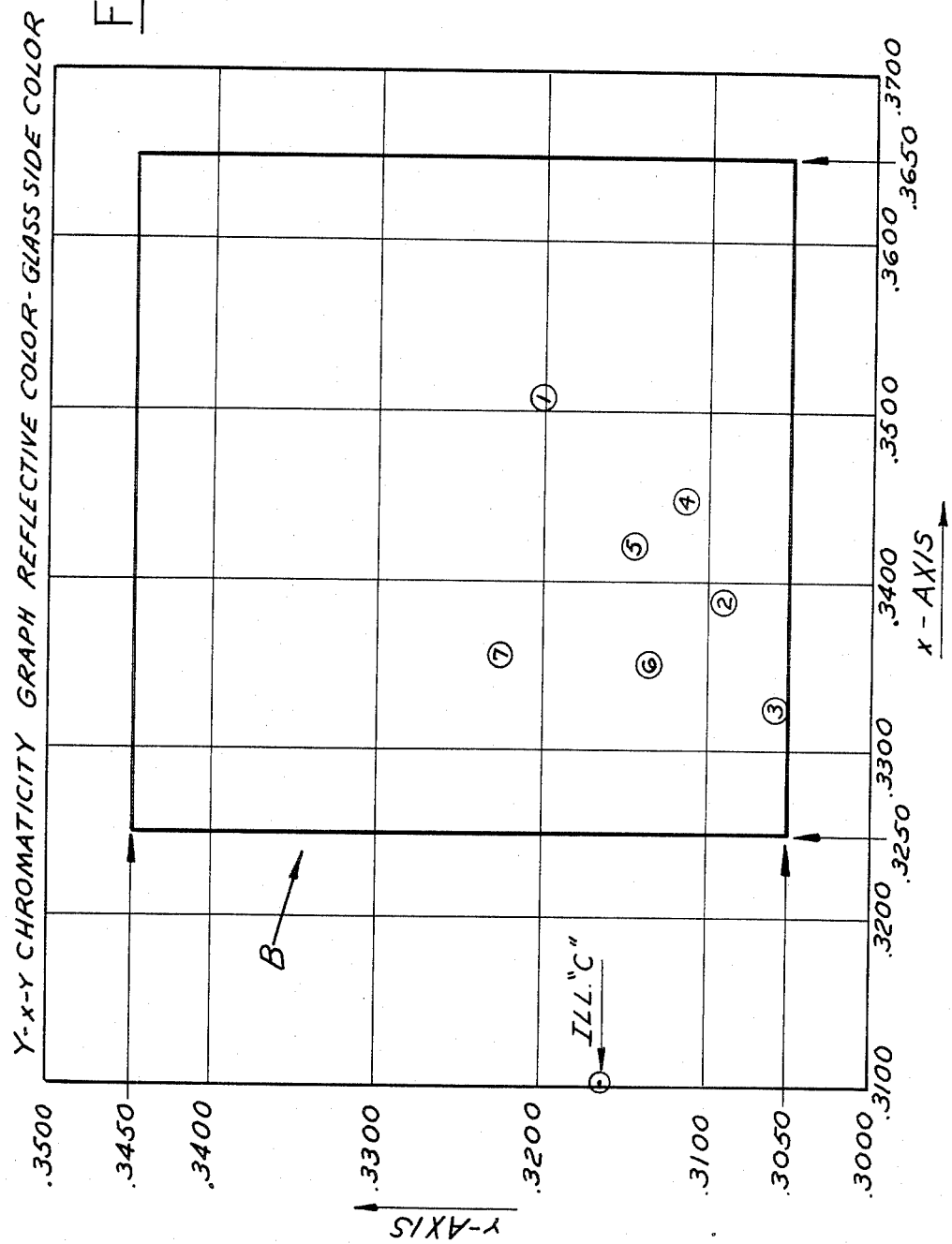

COATED GLASS ARTICLE AS A NEW ARTICLE OF MANUFACTURE

TECHNICAL FIELD

This application is directed to a coated glass article as a new article of manufacture. In particular, this application teaches a glass article coated with a multilayer coating film in which the principal coating material is copper. The article so-produced has particular utility for glazing buildings.

BACKGROUND AND PRIOR ART STATEMENT

At the present time, there is a significant amount of glass used for the exterior glazing of buildings. Not only is this glass designed to allow people within the building to look out of the same, but it is also intended to give the building a very asthetic and pleasing look. The richness of color of a building when viewed from its exterior is a very important item to an architect specifying the type of glass to be used in forming the building. If a particular color of glass has very desirable asthetic qualities, it can become very popular for architects in designing new buildings. Therefore, the development of a coated glass sheet that has asthetically pleasing qualities is a significant commercial event. The designation by many architects of a particular color of glass can lead to a realization of a significant commercial business in that color of glass by the manufacturer thereof.

This specification is directed to a coated glass sheet as a new article of manufacture. The coated glass sheet is one in which a multilayer coating film is laid down on the glass sheet in order to give a color to it. The color developed in this glass is extremely pleasing and one which is in great demand by architectual designers for use in buildings designed by them.

Prior to preparation of this specification, a search on this subject matter was conducted in the U.S. Patent and Trademark Office. As a result of that search, the following U.S. patents were cited: U.S. Pat. Nos. 3,010,850; 3,264,074; 3,854,892; 4,022,947; 4,101,200; 4,272,588; 4,235,048; 4,382,977; and 4,451,525.

We have reviewed all of the cited patents and are of the opinion that none of them have any significant teachings or suggestions with respect to the subject matter disclosed and claimed in this specification. However, each of the patents will be reviewed briefly below.

U.S. Pat. No. 3,010,850, issued on Nov. 28, 1961 for "Electrically Conducting Coated Glass or Ceramic Article Suitable for Use As a Lens, a Window or a Windshield, or the Like." This patent is directed to an electrically conductive, transparent article which includes a body of glass and a continous, transparent, electrically conductive layer carried by the body. The layer is deposited by molecular deposition and is composed essentially of an intimate molecular mixture of metal and a metallic inorganic dielectric compound. The proportion of the metal to the dielectric compound in the layer and the thickness of the layer on the body of glass is such that the layer is electrically conductive and serves to carry a major portion of electric current carried by the body.

U.S. Pat. No. 3,264,074, issued on Aug. 2, 1966, for "Thin Film Electron Emissive Electrode." This patent is directed to a thin film, electron-emissive electrode with good adherence characteristics on an insulating base. This unit comprises a glass substrate, a first thin film of a berylium-copper alloy deposited on the substrate, and a second thin film of an electron-emissive iron and nickel composition deposited on the first layer.

U.S. Pat. No. 3,854,892, issued on Dec. 17, 1974, for "Direct Bonding of Metals with Metal-Gas Eutectic." This patent describes a method for direct bonding of metallic members to other metallic members with a metal-gas eutectic. The method comprises placing a metal member such as copper, for example, in contact with another metal member, such as nickel, for example, and heating the metal members to a temperature slightly below the melting point of the lower melting point metal, for example, approximately 1072° C. for copper. The heating is performed in a reactive atmosphere such as an oxidizing atmosphere, for a sufficient time to create a metal-gas eutectic melt which upon cooling bonds the metal members together.

U.S. Pat. No. 4,022,947, issued on May 10, 1977, for "Transparent Panel Having High Reflectivity for Solar Radiation and Method of Preparing Same." This patent discloses a transparent panel capable of transmitting a desired proportion of visible radiation while reflecting a large proportion of incident solar radiation and a method of preparing the same. The method is carried out by sputtering an iron, nickel and chromium alloy to obtain a transparent metal film and reactively sputtering the same or a similar alloy in the presence of oxygen. In a preferred embodiment, the metal film lies between the substrate and the metal oxide film which provides a continuous protective overlayer.

U.S. Pat. No. 4,101,200, issued on July 18, 1978, for "Coating Composition for a Light Transmitting Absorbing Coating on Substrates." This patent discloses a light transmitting, absorbing coating produced on a substrate by depositing layers of silicon in an oxidizing residual gas atmosphere and chrome in a nonoxidizing residual gas atmosphere in alternate layers by cathodic sputtering. The light transmitting layer comprises a substrate having a coating of a bluish-gray transmission color which comprises a plurality of alternate chrome and silicon dioxide layers with the thickness of individual chrome layers being smaller than 10 nm.

U.S. Pat. No. 4,272,588, issued on June 9, 1981, for "Oxide Protected Mirror." This patent discloses a mirror made by applying a coating to a highly reflective surface of a substrate. The coating is prepared from a composition of an alkoxide having the general formula $M[OR]_n$ where M is 0–100% titanium, 0–25% silicon, 0–100% tantalum, or 0–15% of a metal ion which forms an alkoxide, R is alkyl from $C_1$ to $C_6$ and n is the valence of M, about 1.7 to about 8 mols of water per mol of alkoxide, sufficient alcohol to give solids content of 0.5 to about 15%, and a sufficient amount of a suitable acid to prevent cloudiness. The coated substrate is fired at about 200°–600° C. to form an oxide coating which is substantially oxygen-impervious. Additional layers of the coating may be applied and fired until the oxide coating is about 200–500 angstroms thick, avoiding quarter-wave thickness.

U.S. Pat. No. 4,235,048, issued on Nov. 25, 1980, for "Reversible Window Unit for Alternately Reflecting and Absorbing Solar Energy." This patent discloses a multiple layer coating on a window unit so that the unit can function efficiently as a solar energy collector in winter and as a heat shield in summer. The coating comprises a layer of metal which provides high reflectance of incident solar energy from one side of a coated transparent substrate and a layer which provides high absorption of incident solar energy by the other side of the coated substrate.

U.S. Pat. No. 4,382,977, issued on May 10, 1983, for "Method of Producing Smooth Metallic Layers on a Substrate." This patent discloses a method in which smooth layers of metal are produced on a glass substrate where a large differential expansion coefficient of the metal relative to the substrate produces very large stresses in the metal when the metal substrate is subjected to a post-deposition anneal. The method of the patent involves depositing a layer of metal having a very small self diffusion coefficient at the anneal temperature prior to deposition of the metal having the large differential expansion coefficient.

U.S. Pat. No. 4,451,525, issued on May 29, 1984, for "Products Having Compound Membrane." This patent discloses a product with a compound membrane which comprises a molded substrate, a metal membrane having an average thickness equal to or less than the maximum surface roughness of the molded substrate on the molded substrate, and a dielectric membrane having a thickness of 100 angstroms or more on the metal membrane.

Upon a reading of the various patents briefly discussed above and a reading of the remainder of this specification, it will become readily apparent to those skilled in the art that the prior art cited in the search did not suggest the subject matter specifically set forth and claimed in this specification.

DISCLOSURE OF INVENTION

This invention relates to a coated glass article as a new article of manufacture and, more particularly, to a coated glass article as a new article of manufacture, which coated glass article is one which may be used as an exterior panel in a building.

In accordance with the teachings of this invention, a new article of manufacture is formed of the following elements. A glass sheet is provided having first and second sides. The sides of the glass sheet are spaced apart in generally parallel planes. A multilayer coating film is formed on one of the sides of the glass sheet. The side of the glass sheet having the multilayer coating film thereon is designated as the film side of the glass sheet while the other side is designated as the glass side of the glass sheet.

The multilayer coating film is a film selected from the group of films consisting of a copper, stainless steel, titanium dioxide multilayer film; a copper, titanium, titanium dioxide multilayer film; and a copper, titanium, titanium nitride multilayer film. In each case, the copper portion of the multilayer film is the part of the film in direct contact with the glass.

The multilayer coating film is characterized, when being tested for such characteristics, on a 6 millimeter (mm) thick clear glass, as having the following characteristics. A first characteristic of the multilayer coating film is that it has a film side Y-x-y chromaticity value of reflective color falling within area A of the graph of FIG. 1 of the drawings attached to this specification. A second characteristic of the multilayer coating film is that it has a glass side Y-x-y chromaticity value of reflective color falling within area B of the graph of FIG. 2 attached to this specification. A third characteristic of the multilayer coating film is that it has a visible transmittance of 5–40% for an Illuminant "C" light source. A fourth characteristic of the multilayer coating film is that it has a capital Y reflectance value ranging from 5–55 for film side reflectance and 10–45 for glass side reflectance.

The color of glass when viewed from the film side thereof is a very asthetically pleasing copper/bronze color. This colored glass on a building reflects the surroundings of the building in a soft muted tone which is highly pleasing and restful to the eye. Reflected colors are subdued and blended together to give a very pleasing effect to one viewing the building from the exterior thereof. When the building having such glass is viewed from a long distance away, the exterior color of the glass softens the view and blends the building into any background colors of a copper and brownish hue.

Thus, the new glass article of our invention has very desirable characteristics. The article of manufacture is one in which the copper layer adjacent the glass may have a thickness in a range from 25–1000 angstroms, preferably 100–400 angstroms, the intermediate layer of stainless steel or titanium has a thickness of 5–500 angstroms, preferably 25–200 angstroms, and the exterior layer of titanium dioxide or titanium nitride has a thickness of 5–1000 angstroms, preferably 25–400 angstroms.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, and in which:

FIG. 1 is a Y-x-y chromaticity graph of reflective color for film side color; and FIG. 2 is a similar graph of reflective color for glass side color.

BEST MODE AND INDUSTRIAL APPLICABILITY

The following description is what we consider to be a preferred embodiment of the new glass sheet article of manufacture of our invention. The following description also sets forth what we now contemplate to be the best mode of constructing our new article of manufacture. This description is not intended to be a limitation upon the broader principles of this construction.

The new article of manufacture in accordance with the teachings of our invention is an article of manufacture made by coating a sheet of glass. The sheet of glass is normal soda/lime glass manufactured throughout the United States and the entire world. This glass generally is a clear glass in that it does not have a tint contained in the body of the glass itself in order to give it a particular color such as green, bronze or brown. Thus, the base upon which our new article of manufacture is formed is a sheet of generally clear glass, as the term clear is known in the art, having first and second sides. Generally, the process by which the glass sheet is manufactured is one in which the first and second sides of the glass sheet are spaced apart in generally parallel planes If the float glass process of manufacturing the sheet is used, the planes are remarkably parallel to one another because of the fact that the molten glass floats upon a bath of molten tin during a portion of its manufacture.

In accordance with the teachings of our invention, a multilayer coating film is placed on one side of the sheet of glass. The side of the glass sheet having the multilayer coating film placed thereon is generally designated in the art as "the film side of the glass sheet" while the other side is designated as the "glass side of the glass sheet." In this specification, certain characteristics of the glass sheet, well known to those skilled in the art, will be given. The characteristics will be designated as being the film side characteristics or the glass side characteristics of the glass sheet so that the measurements may be commonized; a principal measurement of reflective color will be made for a glass sheet having 6 mm thickness. If, for example, the coatings are applied to thicker or thinner glass, the characteristics of the film may change, particularly the glass side color thereof. However, if one uses a thicker or thinner glass sheet, the calculations of the reflective color can be commonized to a 6 mm glass thickness in order to compare it to the data given herein and the subject matter specifically claimed herein.

The multilayer coating film used on the glass sheet in accordance with the teaching of our invention is one that has three layers. In all cases, the first layer bonded directly to the glass sheet on the film side is a copper layer.

The multilayer coating film is a film selected from the group of films consisting of a copper, stainless steel, titanium dioxide multilayer film; a copper, titanium, titanium dioxide multilayer film; and a copper, titanium, titanium nitride multilayer film. It will be noted that in all cases, copper is the layer of the multilayer film that is adjacent or in contact with the glass sheet. The exact way in which these layers are placed on the glass sheet or on one another will be explained briefly below as all of the layers are placed down in the same or similar manner in basically the same equipment. In this specification and claims we use the term titanium dioxide to mean an oxide form of titanium which is generally a mixed oxide form thereof.

The copper layer has a thickness in a range from 25–1000 angstroms, preferably 100–400 angstroms. The intermediate layer, which acts as a protective layer for the copper layer, is formed of either stainless steel or titanium. This intermediate layer has a thickness of 5–500 angstroms, preferably 25–100 angstroms. The exterior layer, which is an anti-reflective layer to control film color and a protective layer to prevent oxidation of the material therebelow, is generally a layer of either titanium dioxide or titanium nitride. This outer layer has a thickness of 5–1000 angstroms, preferably 25–400 angstroms.

While other processes may be used, we prefer that the layers are individually laid down in a vacuum sputter deposition process. Such processes are well known in the art and are used daily to manufacture coated glass films. A company by the name of BOC, of California, sells such commercial equipment to the trade for manufacturing vacuum sputter coated substrates such as vacuum coated glass substrates. The prior art cited herein also contains a discussion of vacuum sputtering. As is well known in the art, if a pure metal is desired, the vacuum sputtering operation is carried out in a partial vacuum with an inert gas such as argon. However, if an oxide or a nitride layer is desired, the sputtering operation is carried out in a reduced pressure of very pure oxygen or nitrogen.

Since vacuum sputtering of substrates such as glass is well known in the art, no detailed discussion thereof will be undertaken herein. It is well within the skill of an artisan to prepare the multilayer coating film taught by this invention by conventional sputtering techniques.

The coated glass article of our manufacture is one which has pleasing, asthetic qualities. The color developed by the glass on its film side is one that gives a soft copper color. The articles reflected in the color are soft and have a very lovely appearance. In order to achieve the colors that we have achieved by the coated glass article of our invention, the multilayer coating film applied to the glass is characterized in the following manner when applied to a 6 mm thick clear glass. A first characteristic of the multilayer coating film is that it has a film side Y-x-y chromaticity value of reflective color falling within area A of the graph of FIG. 1. A second characteristic of the multilayer coating film is that it has a glass side Y-x-y chromaticity value of reflective color falling within area B of the graph of FIG. 2. A third characteristic of the multilayer coating film is that it has a visible transmittance of 5–40% for Illuminant C" light source. A fourth characteristic of the multilayer coating film is that it has a capital Y reflectance value from 5–55 for film side reflectance and 10–45 for glass side reflectance.

EXAMPLE 1

A 6 mm clear soda/lime glass was coated with a multilayer coating film in which the first layer was copper having a thickness of 200 angstroms, stainless steel having a thickness of 25 angstroms, and titanium dioxide having a thickness of 25 angstroms in a vacuum sputtering operation. In this sample, the film side reflectance had the following values: $Y=44.8$, $x=0.3468$, $y=0.3241$. The glass sample had a glass side reflectance of: $Y=40.1$, $x=0.3507$, $y=0.3200$. This glass sample had a transmittance of 18.9%, a shading coefficient of 0.186, a total film thickness of 250 angstroms, and an emissivity of 0.070.

EXAMPLE 2

A sample was made as set forth in Example 1, using the same three layers. However, the copper layer had a thickness of 200 angstroms, the stainless steel a thickness of 25 angstroms, and the titanium dioxide a thickness of 100 angstroms. This sample had a film side reflectance of: $Y=29.0$; $x=0.3530$, $y=0.3317$. The sample had a glass side reflectance of: $Y=27.1$, $x=0.3387$, $y=0.3089$. This glass sample had a transmittance of 28.7%, a shading coefficient of 0.289, a film thickness of 325 angstroms, and an emissivity of 0.065.

EXAMPLE 3

The procedure of Example 1 was repeated, but in this case the layers had the following thicknesses: copper 120 angstroms, stainless steel 30 angstroms, and titanium dioxide 120 angstroms. This sample had a film side reflectance of: $Y=24.4$; $x=0.3376$, $y=0.3251$. The sample had a glass side reflectance of: $Y=20.3$, $x=0.3324$, $y=0.3051$. This glass sample had a transmittance of 35%, a shading coefficient of 0.363, a film thickness of 270 angstroms, and an emissivity of 0.090.

EXAMPLE 4

A multilayer coating film of copper, titanium, and titanium dioxide was placed on a 6 mm thick sheet of clear glass by vacuum deposition. The copper had a thickness of 125 angstroms, titanium 25 angstroms, and titanium dioxide 100 angstroms. This sample had a film side reflectance of: $Y=27.8$; $x=0.3455$, $y=0.3258$. The sample had a glass side reflectance of: $Y=23.4$, $x=0.3448$, $y=0.3113$. This glass sample had a transmittance of 33.4 %, a shading coefficient of 0.326, a film thickness of 250 angstroms, and an emissivity of 0.090.

EXAMPLE 5

The procedure of Example 4 was repeated, but in this case the layers had the following thicknesses: copper 135 angstroms, titanium 25 angstroms, and titanium dioxide 100 angstroms. This sample had a film side reflectance of: Y=28.5; x=0.3567, y=0.3371. The sample had a glass side reflectance of: Y=26.0, x=0.3422, y=0.3145. This glass sample had a transmittance of 33%, a shading coefficient of 0.326, a film thickness of 260 angstroms, and an emissivity of 0.090.

EXAMPLE 6

In this case a multilayer coating was placed on 6 mm clear glass by vacuum sputter deposition. The coating was formed of: copper 230 angstroms, titanium 30 angstroms, and titanium nitride 40 angstroms. This sample had a film side reflectance of: Y=34.3; x=0.3433, y=0.3272. The sample had a glass side reflectance of: Y=39.3, x=0.3352, y=0.3136. This glass sample had a transmittance of 16.5%, a shading coefficient of 0.217, a film thickness of 300 angstroms, and an emissivity of 0.080.

EXAMPLE 7

The procedure of Example 6 was repeated, except the coating had a thickness of: copper 250 angstroms, titanium 30 angstroms, and titanium nitride 40 angstroms. This sample had a film side reflectance of: Y=37.6; x=0.3414, y=0.3327. The sample had a glass side reflectance of: Y=44.9, x=0.3356, y=0.3224. This glass sample had a transmittance of 12.3%, a shading coefficient of 0.217, a film thickness of 320 angstroms, and an emissivity of 0.080.

All of the samples generated had a visible transmittance in the range of 5=40%, and a reflectance value for Y of 5–55 for the film side and 10–45 for the glass side.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:
1. As a new article of manufacture:
   a glass sheet having first and second sides, said sides being spaced apart in generally parallel planes;
   a multilayer coating film on one of said sides of said glass sheet, said side of said glass sheet having said multilayer coating film thereon designated as said film side of said glass sheet while said other side is designated as said glass side of said glass sheet;
   said multilayer coating film being a film selected from the group of films consisting of a copper, stainless steel, titanium dioxide multilayer film; a copper, titanium, titanium dioxide multilayer film; and a copper, titanium, titanium nitride multilayer film;
   said multilayer coating film also being characterized when applied to 6 mm clear glass as having (1) a film side Y-x-y chromaticity value of reflective color falling within area A of the graph of FIG. 1; (2) a glass side Y-x-y chromaticity value of reflective color falling within area B of the graph of FIG. 2; (3) a visible transmittance of 5–40% for an Illuminant "C" light source; and (4) a capital Y reflectance value from 5–55 for film side reflectance and 10–45 for glass side reflectance.

2. The new article of manufacture as defined in claim 1, wherein the copper layer adjacent the glass of the multilayer coating film has a thickness in a range from 25–1000 angstroms, the intermediate layer has a thickness in the range from 5–500 angstroms, and the exterior layer has a thickness in a range from 5–1000 angstroms.

3. The new article of manufacture as defined in claim 1, wherein the copper layer adjacent the glass of the multilayer coating film has a thickness in a range from 100–400 angstroms, the intermediate layer has a thickness in the range from 25–100 angstroms, and the exterior layer has a thickness in a range from 25–400 angstroms.

* * * * *